(12) United States Patent
Ravichandran et al.

(10) Patent No.: US 12,361,621 B2
(45) Date of Patent: Jul. 15, 2025

(54) CREATING IMAGES, MESHES, AND TALKING ANIMATIONS FROM MOUTH SHAPE DATA

(71) Applicant: SAMSUNG ELECTRONICS CO., LTD., Gyeonggi-Do (KR)

(72) Inventors: Siddarth Ravichandran, Santa Clara, CA (US); Anthony Sylvain Jean-Yves Liot, San Jose, CA (US); Dimitar Petkov Dinev, Sunnyvale, CA (US); Ondrej Texler, San Jose, CA (US); Hyun Jae Kang, Mountain View, CA (US); Janvi Chetan Palan, San Francisco, CA (US); Sajid Sadi, San Jose, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 76 days.

(21) Appl. No.: 17/967,872

(22) Filed: Oct. 17, 2022

(65) Prior Publication Data

US 2023/0394732 A1 Dec. 7, 2023

Related U.S. Application Data

(60) Provisional application No. 63/349,298, filed on Jun. 6, 2022.

(51) Int. Cl.
*G06T 13/40* (2011.01)
*G06T 7/70* (2017.01)
(Continued)

(52) U.S. Cl.
CPC ............... *G06T 13/40* (2013.01); *G06T 7/70* (2017.01); *G06T 17/20* (2013.01); *G10L 15/25* (2013.01); *G06T 2207/30201* (2013.01)

(58) Field of Classification Search
CPC .......... G06T 13/40; G06T 7/70; G06T 17/20; G06T 2207/30201; G10L 15/25
See application file for complete search history.

(56) References Cited

U.S. PATENT DOCUMENTS

| 7,123,262 B2 | 10/2006 | Francini et al. |
| 11,158,102 B2 | 10/2021 | Liu et al. |

(Continued)

FOREIGN PATENT DOCUMENTS

| CN | 110288682 A | 9/2019 |
| CN | 113554737 A | 10/2021 |

(Continued)

OTHER PUBLICATIONS

WIPO Appln. No. PCT/KR2023/005004, International Search Report, Aug. 1, 2023, 3 pg.

(Continued)

*Primary Examiner* — Terrell M Robinson
(74) *Attorney, Agent, or Firm* — Kevin T. Cuenot

(57) ABSTRACT

Creating images and animations of lip motion from mouth shape data includes providing, as one or more input features to a neural network model, a vector of a plurality of coefficients. Each vector of the plurality of coefficients corresponds to a different mouth shape. Using the neural network model, a data structure output specifying a visual representation of a mouth including lips having a shape corresponding to the vector is generated.

20 Claims, 10 Drawing Sheets

(51) Int. Cl.
   *G06T 17/20*      (2006.01)
   *G10L 15/25*      (2013.01)

(56) References Cited

U.S. PATENT DOCUMENTS

| | | | |
|---|---|---|---|
| 11,211,060 B2 | 12/2021 | Li et al. | |
| 11,308,671 B2 | 4/2022 | Chen et al. | |
| 2005/0151743 A1* | 7/2005 | Sitrick | G09G 5/377 345/670 |
| 2005/0286799 A1* | 12/2005 | Huang | G06V 40/162 345/646 |
| 2012/0280974 A1* | 11/2012 | Wang | G10L 21/10 345/419 |
| 2014/0198121 A1 | 7/2014 | Tong | |
| 2018/0174348 A1* | 6/2018 | Bhat | G06T 7/73 |
| 2019/0035130 A1* | 1/2019 | Hutchinson | G06T 17/05 |
| 2019/0138096 A1 | 5/2019 | Lee et al. | |
| 2020/0234482 A1* | 7/2020 | Krokhalev | G06T 13/40 |
| 2020/0402284 A1* | 12/2020 | Saragih | G06V 10/757 |
| 2021/0150793 A1 | 5/2021 | Stratton et al. | |
| 2021/0233299 A1 | 7/2021 | Zhou et al. | |
| 2021/0256962 A1 | 8/2021 | Liu et al. | |
| 2021/0327404 A1 | 10/2021 | Savchenkov et al. | |
| 2021/0350528 A1 | 11/2021 | Tang | |
| 2021/0390748 A1* | 12/2021 | Liao | G06V 10/82 |
| 2022/0084502 A1 | 3/2022 | Ma et al. | |
| 2022/0108510 A1 | 4/2022 | Sagar et al. | |
| 2022/0207262 A1 | 6/2022 | Jeong et al. | |
| 2023/0014604 A1* | 1/2023 | Kim | G10L 21/10 |
| 2023/0042654 A1 | 2/2023 | Zhang | |
| 2023/0394715 A1 | 12/2023 | Texler et al. | |

FOREIGN PATENT DOCUMENTS

| | | | |
|---|---|---|---|
| CN | 113609255 A | | 11/2021 |
| KR | 102251781 B1 | | 5/2021 |
| KR | 20210070169 A | * 6/2021 | G06T 13/80 |
| KR | 1020210070169 A | | 6/2021 |
| WO | 2021023869 A1 | | 2/2021 |
| WO | 2021112365 A1 | | 6/2021 |

OTHER PUBLICATIONS

WIPO Appln. No. PCT/KR2023/005004, Written Opinion, Aug. 1, 2023, 4 pg.

Aneja, D. et al., "A High-Fidelity Open Embodied Avatar with Lip Syncing and Expression Capabilities," In 2019 International Conference on Multimodal Interaction Oct. 14, 2019 (pp. 69-73).

Prajwal, K.R. et al., "A lip sync expert is all you need for speech to lip generation in the wild," arXiv Preprint, arXiv: 2008.10010v1, Aug. 23, 2020, 10 pg.

Ronneberger, O. et al., "U-Net: Convolutional Networks for Biomedical Image Segmentation," arXiv Preprint, arXiv: 1505.04597v1, May 18, 2015, 8 pg.

Siarohin, A. et al., "First Order Motion Model for Image Animation," Advances in Neural Information Processing Systems, 2019, vol. 32, 11 pg.

"Synthesia, #1 AI Video Generation Platform," [online] © 2023 Synthesia Limited [retrieved Nov. 2, 2023], retrieved from the Internet: <https://www.synthesia.io/>, 14 pg.

Suwajanakorn, S. et al. "Synthesizing Obama: Learning Lip Sync from Audio," ACM Transactions on Graphics (ToG), Jul. 20, 2017, vol. 36, No. 4, pp. 1-3 [Abstract].

Theis, J. et al., "Face2Face: Real-time Face Capture and Reenactment of RGB Videos," arXiv Preprint, arXiv: 2007.14808v1, Jul. 29, 2020, 12 pg.

"Pinscreen: AI-Driven Virtual Avatars," [online] © 2020 Pinscreen Inc. [retrieved Nov. 2, 2023], retrieved from the Internet: <https://www.pinscreen.com/>, 8 pg.

Zhou Y. et al., "VisemeNet: Audio-Driven Animator-Centric Speech Animation," ACM Transactions on Graphics (ToG), vol. 37, No. 4, Aug. 2018., pp. 1-10.

Fan et al., "A Deep Bidirectional LSTM Approach for Video-Realistic Talking Head," Multimed. Tools Appl., Springer Science + Business Media New York, 2015, 23 pg.

Yao et al., "Iterative Text-Based Editing of Talking-Heads Using Neural Retargeting," ACM Transactions on Graphics, vol. 40, No. 3, Art. 20, Jul. 2021, 14 pg.

Guo et al., "AD-NeRF: Audio Driven Neural Radiance Fields for Talking Head Synthesis," IEEE/CVF International Conference on Computer Vision (ICCV), 2021, pp. 5764-5774.

EP Appln. No. 23819978, Supplementary European Search Report, Jan. 8, 2025, 9 pg.

Li, L. et al., "Write-a-speaker: Text-based Emotional and Rhythmic Talking-head Generation," In Proc. of the AAAI Conf. on Artificial Intelligence, May 18, 2021, vol. 35, No. 3, pp. 1911-1920; [arXiv:2104.07995v2, May 7, 2021].

* cited by examiner es, mesh# CREATING IMAGES, MESHES, AND TALKING ANIMATIONS FROM MOUTH SHAPE DATA

CROSS-REFERENCE TO RELATED APPLICATIONS

This application claims the benefit of U.S. Application No. 63/349,298 filed on Jun. 6, 2022, which is incorporated herein by reference in its entirety.

TECHNICAL FIELD

This disclosure relates to creating images, meshes, and/or animations that include accurate lip motion.

BACKGROUND

The ability to generate high quality images of characters, whether digital humans, avatars, and other anthropomorphized objects, is becoming increasingly important owing to various reasons including the increasing popularity of the Metaverse, the adoption of virtual experiences across different segments of society, and recent advances in hardware and other technologies such as neural networks that facilitate rapid virtualization. In the case of a digital human, for example, the rendering thereof is intended to closely, if not perfectly, resemble a real human. The quality of the textures used and the resolution of the resulting images play an important role in achieving this goal. As an example, it is preferable that body parts of the digital human be rendered with correct textures such that hair looks like it is composed of individual strands of hair; a shirt looks look like it is made out of fabric; skin has pores; etc. Even for other use cases such as the generation of an avatar, whether a human-like character, a humanoid character, or other anthropomorphized object, accurate generation of certain features such as the mouth and/or lips is important since the perception of such regions by actual humans is very sensitive to any perceivable visual artifacts (e.g., visual irregularities and/or misalignments with respect to audio such as speech).

Available technologies, however, often fail to produce accurate and realistic lip motion. So called "deepfakes" are demonstrative of the current state of the art. Even some of the most realistic deepfakes available exhibit inaccurate lip motions. This is particularly true with respect lip motions corresponding to consonants. Some 3-dimensional (3D) models have been created with more accurate lip geometries. The rendering of 3D models, however, often suffers from a synthetic appearance that lacks the degree of realism attained by deepfakes. As such, creating accurate lip motion remains a technical challenge.

In many cases, characters such as digital humans, avatars, and the like are presented on large screens, which tends to highlight any visual irregularities. For example, a digital human may be displayed on a screen of a kiosk or other system where the screen is sized so that the digital human, as rendered, appears life-size (e.g., of average height and size corresponding to a real human). These displays may be positioned in various locations including, but not limited to, airport halls, hotels, public spaces, and the like. For all of these various use cases and others, it is important for the avatar to be rendered with high quality features including lip motion.

SUMMARY

In one or more embodiments, a computer-implemented method includes providing, as one or more input features to a neural network model, a vector of a plurality of coefficients. There can be one or more vectors of a plurality of coefficients. Each vector of the plurality of coefficients corresponds to a different mouth shape. The method includes generating, using the neural network model, a data structure output specifying a visual representation of a mouth including lips having a shape corresponding to the vector.

In one aspect, the plurality of coefficients of each vector are viseme coefficients. The method can include generating the viseme coefficients from audio data of speech. The method can include encoding the viseme coefficients into the vector provided to the neural network model.

In another aspect, the data structure output is generated directly from the vector of the plurality of coefficients without using any facial landmark data.

In another aspect, the data structure output is a Red-Green-Blue (RGB) 2-dimensional (2D) image.

In another aspect, the data structure output is a mesh.

In another aspect, the generating the data structure output includes generating, using the neural network model, a plurality of images. Each image is generated from a different vector having a plurality of coefficients. The plurality of images collectively represents an animation of lip motion.

In another aspect, the method includes providing to the neural network model, with the vector of the plurality of coefficients, a first mesh of a face. The data structure output is a second mesh generated by the neural network model based on the vector and the first mesh of the face. The second mesh is a version of the first mesh of the face that specifies the mouth including the lips having the shape corresponding to the vector.

In one or more embodiments, a system includes one or more processors configured to initiate operations. The operations include providing, as one or more input features to a neural network model, a vector of a plurality of coefficients. Each vector of the plurality of coefficients corresponds to a different mouth shape. The operations include generating, using the neural network model, a data structure output specifying a visual representation of a mouth including lips having a shape corresponding to the vector.

In one aspect, the plurality of coefficients of each vector are viseme coefficients. The operations can include generating the viseme coefficients from audio data of speech. The operations can include encoding the viseme coefficients into the vector provided to the neural network model.

In another aspect, the data structure output is generated directly from the vector of the plurality of coefficients without using any facial landmark data.

In another aspect, the data structure output is an RGB 2D image.

In another aspect, the data structure output is a mesh.

In another aspect, the generating the data structure output includes generating, using the neural network model, a plurality of images. Each image is generated from a different vector having a plurality of coefficients. The plurality of images collectively represents an animation of lip motion.

In another aspect, the operations include providing to the neural network model, with the vector of the plurality of coefficients, a first mesh of a face. The data structure output is a second mesh generated by the neural network model based on the vector and the first mesh of the face. The second mesh is a version of the first mesh of the face that specifies the mouth including the lips having the shape corresponding to the vector.

In one or more embodiments, a computer program product includes one or more computer readable storage media having program code stored thereon. The program code is executable by one or more processors to perform operations. The operations include providing, as one or more input features to a neural network model, a vector of a plurality of coefficients. Each vector of the plurality of coefficients corresponds to a different mouth shape. The operations include generating, using the neural network model, a data structure output specifying a visual representation of a mouth including lips having a shape corresponding to the vector.

In one aspect, the plurality of coefficients of each vector are viseme coefficients. The operations can include generating the viseme coefficients from audio data of speech. The operations can include encoding the viseme coefficients into the vector provided to the neural network model.

In another aspect, the data structure output is generated directly from the vector of the plurality of coefficients without using any facial landmark data.

In another aspect, the data structure output is an RGB 2D image.

In another aspect, the data structure output is a mesh.

In another aspect, the generating the data structure output includes generating, using the neural network model, a plurality of images. Each image is generated from a different vector having a plurality of coefficients. The plurality of images collectively represents an animation of lip motion.

In another aspect, the operations include providing to the neural network model, with the vector of the plurality of coefficients, a first mesh of a face. The data structure output is a second mesh generated by the neural network model based on the vector and the first mesh of the face. The second mesh is a version of the first mesh of the face that specifies the mouth including the lips having the shape corresponding to the vector.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings show one or more embodiments; however, the accompanying drawings should not be taken to limit the invention to only the embodiments shown. Various aspects and advantages will become apparent upon review of the following detailed description and upon reference to the drawings.

DETAILED DESCRIPTION

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to creating images, meshes, and/or animations that include accurate lip motion (e.g., a talking animation). In accordance with the inventive arrangements disclosed herein, methods, systems, and computer program products are disclosed that are capable of generating visual representations of mouth regions that include lips. The lips may be generated, drawn, or rendered with a particular lip geometry, e.g., shape. The images are generated using a generative neural network model that is configured, or trained, on mouth shape data. Given an input vector specifying mouth shape data, the generative neural network model is capable of generating an visual representation such as an image or a mesh that includes a region with lips that are highly accurate. The lips have a shape or geometry that is highly realistic. The visual representations that are generated may be used to create an animation of lip motion to simulate a character speaking or talking. As used within this disclosure, the term "animation" means a series of images (e.g., frames) or meshes that may be played in sequence as video to show motion. Because the generated visual representations are of high quality, the animation generated from such visual representations depicts highly accurate and realistic lip motion.

Further aspects of the inventive arrangements are described below in greater detail with reference to the figures. For purposes of simplicity and clarity of illustration, elements shown in the figures are not necessarily drawn to scale. For example, the dimensions of some of the elements may be exaggerated relative to other elements for clarity. Further, where considered appropriate, reference numbers are repeated among the figures to indicate corresponding, analogous, or like features.

Figure 1:
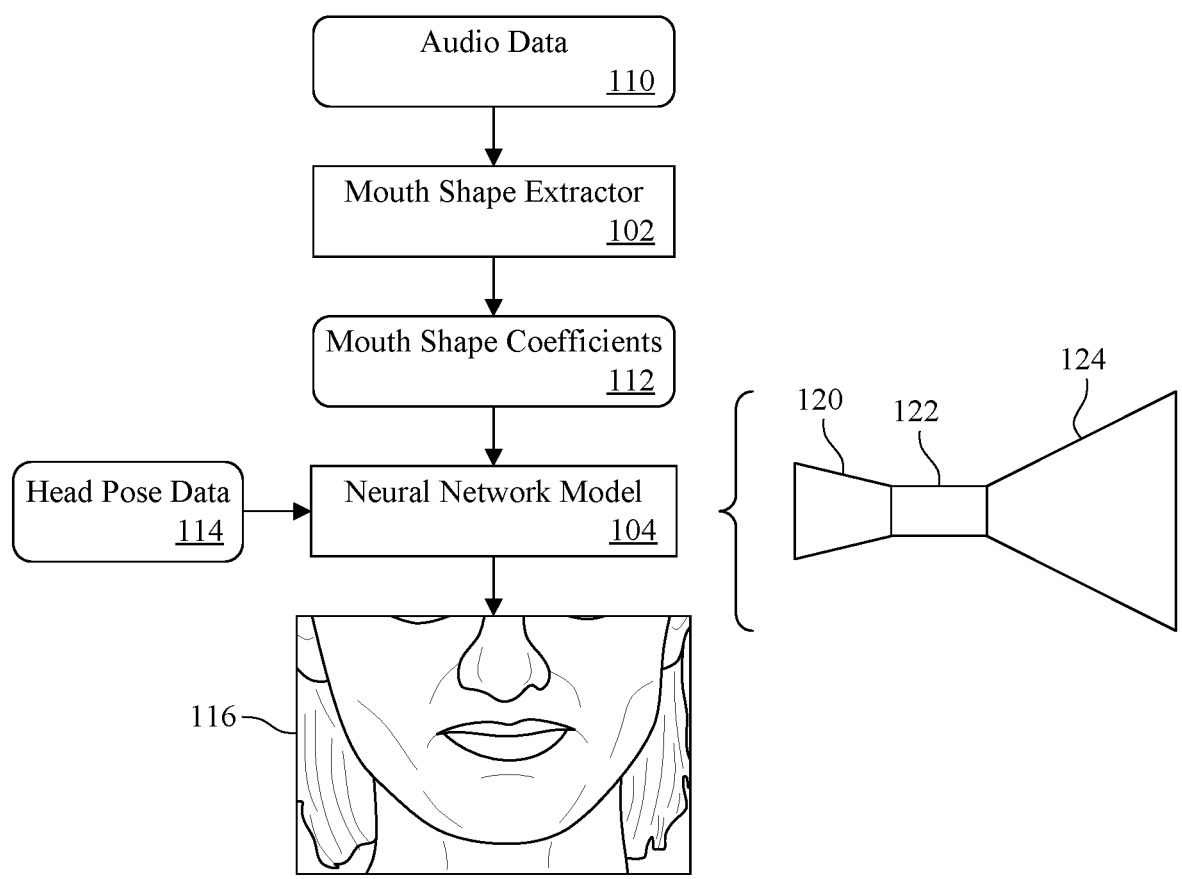
FIG. 1 illustrates an example of an architecture that is executable by a data processing system to perform image generation.

FIG. 1 illustrates an example of an architecture 100. Architecture 100 is capable of generating a visual representation such as an image. Architecture 100 may be implemented as a software framework that is executable by a data processing system. An example of a data processing system that is suitable for executing architecture 100 as described herein and/or for training a neural network model included in architecture 100 is described herein in connection with FIG. 10.

In the example, architecture 100 includes a mouth shape extractor 102 and a neural network model 104. Mouth shape extractor 102 and neural network model 104 are arranged in series as a pipeline. In general, mouth shape extractor 102 receives audio data 110 as input. Audio data 110 may contain speech. Mouth shape extractor 102 extracts, from audio data 110, mouth shape data that is encoded as mouth shape coefficients 112. In the example, neural network model 104 is conditioned on the output from mouth shape extractor 102, e.g., mouth shape coefficients 112. That is, mouth shape coefficients 112, as output from mouth shape extractor 102, are fed, or provided, to neural network model 104 as input.

In one or more example implementations, throughout this disclosure, mouth shape coefficients 112 may be specified in terms of visemes. The term "viseme" is derived from the phrase "visible phoneme" and is a geometric representation of a phoneme. A viseme specifies a shape of a mouth at the apex of a given phoneme. Each phoneme is associated with, or is generated by, one viseme. Each viseme may represent one or more phonemes. In this regard, there is a many to one mapping of phonemes to visemes. Visemes are typically generated as artistic renderings of the shape of a mouth, e.g., lips, in speaking a particular phoneme. Visemes convey 3D data of the shape of a mouth in generating phoneme(s) mapped thereto. Visemes also are largely speaker (e.g., voice) independent.

Example viseme extraction techniques that may be used to implement mouth shape extractor 102 are described in Edwards et al., "JALI: An Animator-Centric Viseme Model for Expressive Lip Synchronization," ACM SIGGRAPH '16 Technical Paper, Jul. 24-28, 2016, Anaheim, CA, which is incorporated herein by reference in its entirety. It should be appreciated that any available or known viseme extraction technique may be used to implement mouth shape extractor 102.

In one or more examples, mouth shape extractor 102 is capable of encoding the mouth shape data as a plurality of mouth shape coefficients 112. Mouth shape coefficients 112 may be encoded or represented as a vector. As an illustrative example, there may be tens of different visemes for a given language. The mouth shape coefficients 112, as output from mouth shape extractor 102, may be encoded as a vector that includes one coefficient for each different mouth shape, or viseme, used. The coefficient of each viseme represents the contribution of that particular viseme to the shape/geometry of the mouth in producing a particular segment or portion of sound (e.g., a portion of speech) from audio data 110. Accordingly, different segments of audio data 110 may be specified as a vector of viseme coefficients. The vector may be a 1-dimensional vector of a plurality of coefficients.

In one or more example implementations, mouth shape extractor 102 is capable of encoding the mouth shape data as one or more vectors of a plurality of coefficients (e.g., each vector having a plurality of coefficient).

In one or more example implementations, neural network model 104 may be implemented as an image-to-image translation network. Image-to-image translation networks are generative neural network models. Examples of generative neural network models can include, but are not limited to, Generative Adversarial Networks (GANs) and Variational Autoencoders (VAEs).

In general, a GAN includes two neural networks referred to as a generator and a discriminator. The generator and the discriminator are engaged in a zero-sum game with one another. Given a training set, a GAN is capable of learning to generate new data with the same statistics as the training set. As an illustrative example, a GAN that is trained on an image or image library is capable of generating different images that appear authentic to a human observer. In a GAN, the generator generates images. The discriminator determines a measure of realism of the images generated by the generator. As both neural networks may be dynamically updated during operation (e.g., continually trained during operation), the GAN is capable of learning in an unsupervised manner where the generator seeks to generate images with increasing measures of realism as determined by the discriminator.

An autoencoder refers to an unsupervised artificial neural network that learns how to efficiently compress and encode data. The autoencoder learns how to reconstruct the data back from the reduced encoded representation to a representation that is as close to the original input as possible. A VAE is an autoencoder whose encoding distribution is regularized during the training in order to ensure that the latent space has properties sufficient to allow the generation of some portion of new data.

In one or more example implementations, neural network model 104 may be implemented as a U-Net neural network. An example of a neural network implemented as a U-Net neural network is described in Ronneberger et al., "U-Net" Convolutional Networks for Biomedical Image Segmentation," (May 18, 2015), which is incorporated herein by reference in its entirety.

In the example of FIG. 1, neural network model 104 also receives head pose data 114 in addition to mouth shape coefficients 112. Neural network model 104 is trained to generate a data structure output such as image 116 given the vector of mouth shape coefficients 112 and head pose data 114. More specifically, neural network model 104 is trained to generate an image 116 of a mouth. Image 116 includes lips having a shape (e.g., geometry) corresponding to the vector of mouth shape coefficients 112.

In general, a neural network model may be trained to a point where the parameters of the neural network model have converged or substantially converged. The goal of the training process is to change the input-output relationship of the neural network model. The training process determines a set of parameters, e.g., weights and/or biases, that provide the neural network model with the desired input-output relationship. As an illustrative example, a learning process can adjust the weights of a neural network model repeatedly to change the input-output relationship so that an input-output accuracy cost function is optimized. During the training process, computational efficiency and/or power efficiency may not be a consideration. The term "computational efficiency," as used within this disclosure, means the ability to perform operations as part of executing a neural network model without wasting time or energy, where the operations include, but are not limited to, calculations (e.g., multiply, add, and so forth) and memory accesses. While power efficiency may be considered independently of computational efficiency, increased power efficiency may arise from increased computational efficiency of a system.

Image 116, which is of a mouth, may be generated as a 2-dimensional (2D) Red-Green-Blue (RGB) image. In one or more example implementations, image 116 may be incorporated within, or used as part of, a character. In this manner, the character includes a high-quality image as the mouth region including accurate mouth shape and lip shape. The character may be an avatar or a digital human in any of a variety of different computing contexts such as video games, internet forums, and/or virtual environments which may include the Metaverse. Thus, architecture 100, given conditions such as audio data 110, is capable of generating a high-quality image of a mouth. A sequence of images 116 may be played as a video to animate a mouth speaking and/or a human face speaking. Architecture 100 is capable of generating one image 116 for each received vector of mouth shape coefficients 112 as extracted from audio data 110 so that the resulting images and/or animation of lip motion accurately tracks or synchronizes with speech contained in audio data 110 (e.g., a talking animation).

The example implementations described herein are not dependent on any particular representation of visemes. In one or more example implementations, 34 visemes are used resulting in vectors of 34 coefficients being provided to neural network model 104. Neural network model 104, for example, may generate one image as output for each vector of 34 coefficients received. It should be appreciated, however, that other viseme frameworks with a different number of visemes may be used. Other example mouth-shape frameworks that may be used or adapted for use herein in place of visemes can include, but are not limited to, "blendshapes" also referred to as "morph targets."

In one or more other example implementations, the architectures described herein may be generalized beyond visemes. Because there is no assumption as to what the audio representation should to be, a mechanism other than visemes may be used so long as the mechanism or representation closely corresponds to mouth shapes.

The example architecture 100 of FIG. 1 differs from other conventional image generation systems in several respects. One difference is that architecture 100 utilizes mouth shape coefficients 112 as extracted from audio data 110 as opposed to extracting mel frequency cepstral coefficients (MFCCs). MFCCs describe the overall shape of a spectral envelope of a segment of audio. Unlike visemes, MFCCs tend to have a voice bias (e.g., voice dependence). That is, MFCCs tend to exhibit biases for the particular speaker captured in the audio data. In using MFCCs, for example, significant training must be performed using a large quantity of different identities (e.g., voices) with different speech amplitudes to overcome any such bias. This is often not feasible when seeking a high-quality result.

Another difference is that architecture 100 generates image 116 directly from mouth shape data (e.g., specified or encoded as mouth shape coefficients 112). More specifically, architecture 100 does not use or generate any facial landmark data in generating image 116. The term "facial landmark data" means one or more keypoints. Facial landmark data, or keypoints, are individual points corresponding to different parts of a face such as corners of the lips, corners of the eyes, etc. Many conventional image generation systems use keypoints in generating images of mouths. The keypoints are used as landmarks to guide image generation. Facial landmark data lacks accuracy as such data is a prediction of the location of features of the face such as the lips within the image to be generated. The inaccuracy of facial landmark data also flows from the fact that facial landmark data are 2D data points that lack depth information. In terms of generating images of mouths and lip shapes, facial landmark data are unable to represent certain shapes such as "ahhh" and "ooo." More specifically, when flattened from a 3D representation to a 2D representation, the facial landmark data generated for these two different sounds looks the same in a 2D space despite each having different depth information. By comparison, mouth shape data, being 3D in nature, preserves such data thereby permitting disambiguation between shapes corresponding to "ahhh" and "ooo."

Each of the various architectures described herein, by avoiding generation and/or any reliance on facial landmark data, retains the 3D information of mouth shape data. The mouth shape coefficients 112 of the vector provided to neural network model 104 retain depth information unlike facial landmark data thereby allowing neural network model 104 to generate an image with high-quality lip shape.

For purposes of illustration, neural network model 104 includes an encoder 120, coupled to one or more layers 122. Layer(s) 122 are coupled to a decoder 124. FIG. 1 illustrates that, owing to the use of the vector of mouth shape coefficients 112, the size of encoder 120 is smaller than is required with other conventional techniques for image generation such as those that utilize MFCCs and/or facial landmark data. FIG. 1 also illustrates that image generation is performed directly from the vector of mouth shape coefficients 112. The smaller encoder implementation facilitates more efficient execution of architecture 100 by a data processing system (e.g., faster runtimes and/or execution using fewer hardware resources).

Figure 2C:
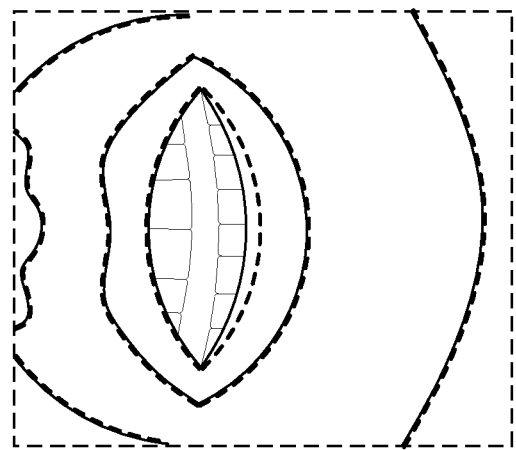
FIGS. 2A, 2B, and 2C illustrate examples of facial landmark data.
Figure 2B:
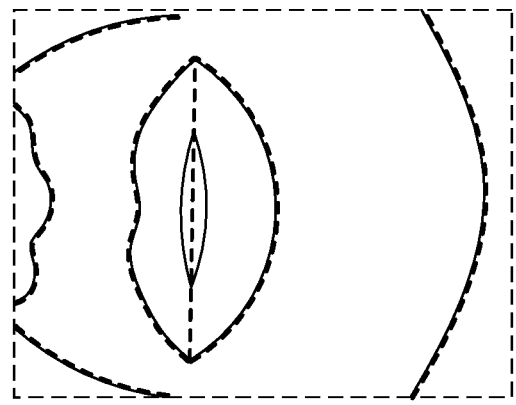
Figure 2A:
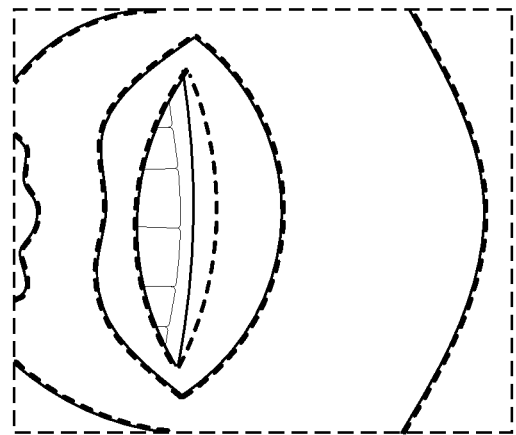

FIGS. 2A, 2B, and 2C illustrate examples of facial landmark data. While facial landmark data may be used for large, noticeable expressions such as smiles, facial landmark data are unable to capture the subtle shapes of the lips that commonly appear during human speech. The examples of FIGS. 2A, 2B, and 2C are derived from real-world data to illustrate inaccuracies commonly associated with facial landmark data. In the examples, the lines superposed atop the respective images are drawn from facial landmark data (e.g., keypoints). As may be observed, the lines drawn based on facial landmark data are not aligned with the edges of the lips. For example, the lines miss the curvature of the lips.

In the example of FIG. 2A, the top of the lower lip is misaligned with the corresponding line drawn from the facial landmark data. In the example of FIG. 2B, the lines drawn based on the facial landmark data indicate that the lips are closed when this is not the case thereby missing the mouth opening. In the example of FIG. 2C, the facial landmark data is misaligned with the top portion of the lower lip. Image generation techniques that rely on facial landmark data are constrained by the limitations of facial landmark data itself. That is, the inaccuracy of the facial landmark data manifests in the images that are generated in the form of lesser realism with respect to lip geometry and/or motion.

Figure 3:
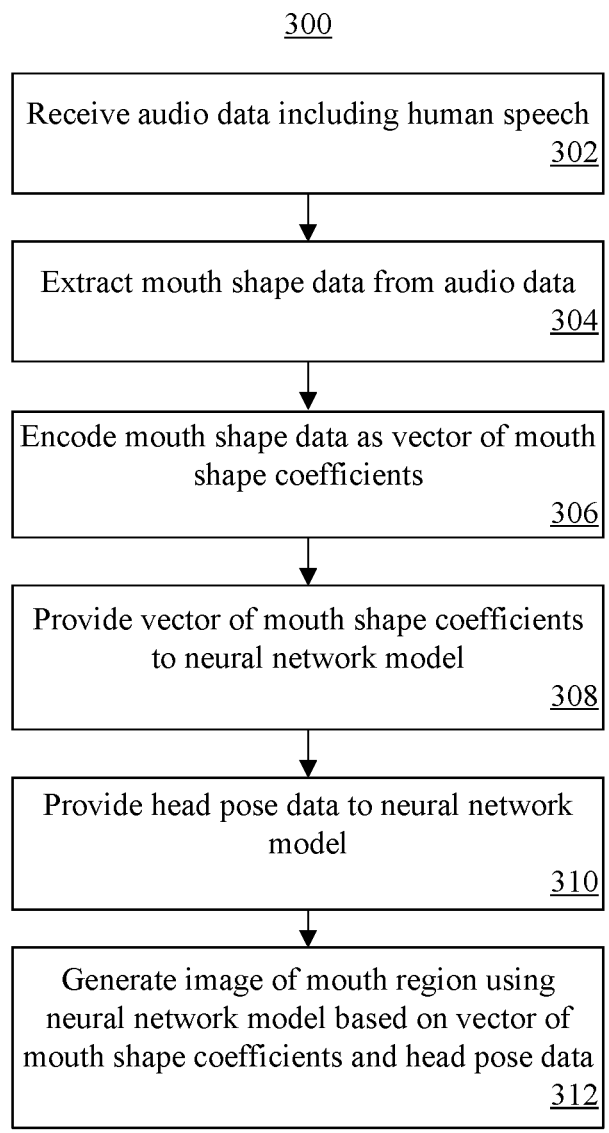
FIG. 3 illustrates an example method that may be performed by a system executing the architecture of FIG. 1.

FIG. 3 illustrates an example method 300 that may be performed by a system executing architecture 100. As discussed, architecture 100 may be executed by a data processing system, e.g., a computer, as described in connection with FIG. 10 or another suitable computing system.

In block 302, the system receives audio data 110. The audio data includes human speech. In block 304, the system extracts mouth shape data from audio data 110 using mouth shape extractor 102. In block 306, mouth shape extractor 102 encodes the extracted mouth shape data as a vector of a plurality of mouth shape coefficients 112. The mouth shape coefficients may be viseme coefficients. In block 308, the system provides the vector of mouth shape coefficients 112 to neural network model 104 as input. In block 310, the system optionally provides head pose data 114 to neural network model 104. In block 312, neural network model 104 generates a data structure output that specifies a visual representation. For example, neural network model 104 generates image 116 of a mouth region. Image 116 includes lips having a shape corresponding to the vector of mouth shape coefficients 112.

It should be appreciated that method 300 may iterate to generate further images 116. In general, for each vector of mouth shape coefficients 112 extracted from audio data 110, which corresponds to a particular moment in time, neural network model 104 is capable of generating an image 116. Accordingly, for a sequence of vectors of mouth shape coefficients 112 extracted from audio data 110, where audio data 110 includes human speech, the system is capable of generating a plurality of images 116 that, taken collectively, form an animation of lip motion (e.g., a talking animation). In one or more example implementations, human speech includes speech generated using a technology such as text-to-speech.

In some cases, realism may not be desired, needed, or the primary goal. As an example, many virtual environments such as 3D game worlds contain specific, intentionally unrealistic, and stylized artistic features. Even in such environments, accurate lip motion of characters is still necessary to convey a sense that the character is actually speaking. The inventive arrangements described within this disclosure may be used to drive accurate lip motion for 3D characters. For example, a mouth shape to "mesh" pipeline may be used to provide enhanced realism for mouth and/or lip motion for characters despite such characters having an intentionally unrealistic appearance.

Conventional techniques for creating mouth motion may include retargeting. Retargeting refers to a process in which motion from one hierarchy of items is transferred to another. As an example, motion such as the manner in which a character walks may be applied to another character. With retargeting, there is no guarantee that the motion is transferrable or that the transferred motion will not be unnatural for the character to which the motion is transferred. By generating a mesh specifying positions of features, the resulting image(s) may be controlled with greater accuracy. A mesh refers to a 3D representation of an object or objects. A mesh may be any of a variety of different types. A mesh represents objects in 3D with intersecting contour lines. A polygon mesh represents objects in 3D with vertices, edges, and faces. The mesh is capable of specifying features and contours of surfaces of an object in 3D. Thus, a mesh of a mouth or face, for example, can provide increased accuracy of lip motion for 3D characters.

Figure 4:
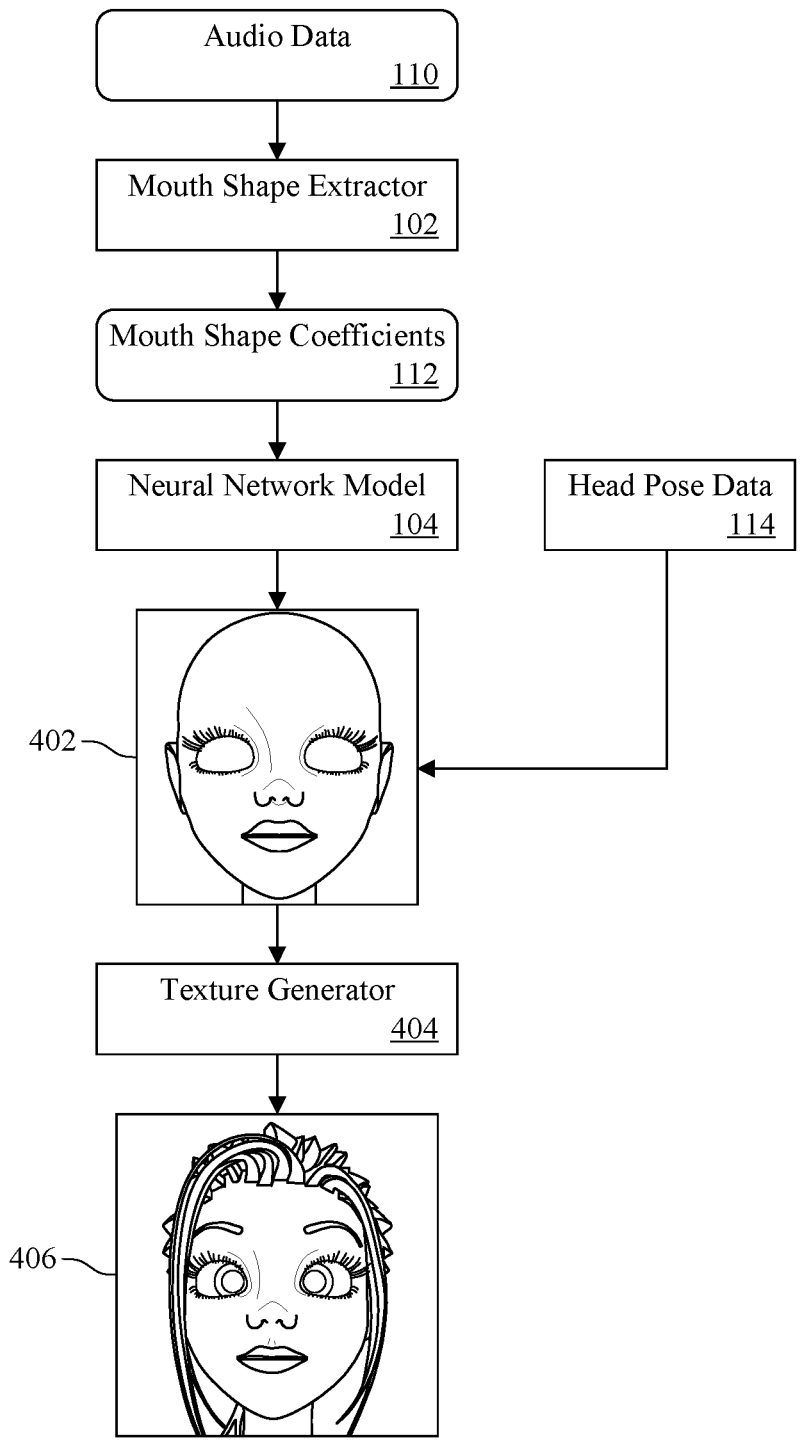
FIG. 4 illustrates another example of an architecture adapted to operate with meshes.

FIG. 4 illustrates another example implementation of architecture 100 adapted to operate with meshes. In the example of FIG. 4, neural network model 104 is trained to generate a mesh 402. Further, architecture 100 includes a texture generator 404 that is capable of applying or rendering a texture for the mesh 402 generated by neural network model 104.

Certain portions of architecture 100 of FIG. 4 operate substantially similar to the example of FIG. 1. For example, mouth shape extractor 102 extracts mouth shape data from audio data 110 and encodes the mouth shape data as a vector of mouth shape coefficients 112 that are provided to neural network model 104 as input. As noted, mouth shape coefficients 112 may be viseme coefficients. Neural network model 104 also receives head pose data 114 as input.

In this example, neural network model 104 is trained to generate a mesh 402. In the example of FIG. 4, mesh 402 specifies a 3D representation of a head and face. Mesh 402 further specifies a mouth region including lips. Mesh 402, as generated by neural network model 104, is provided to texture generator 404 as input. Texture generator 404 is capable of generating textures atop of mesh 402 to produce image 406 (e.g., a 2D representation of the mesh). In the example, texture generator 404 generates image 406 with skin textures, eye textures, eyebrow textures, hair textures, and lip textures that are superposed on mesh 402. Mesh 402 and image 406 each include lips having a shape (e.g., geometry) corresponding to the vector of mouth shape coefficients 112.

In the example of FIG. 4, the process may be repeated to generate further mesh 402 and/or image 406 to produce an animation of lip motion (e.g., a talking animation). Mesh 402 and image 406 each include lips having a shape (e.g., geometry) corresponding to the vector of mouth shape coefficients 112.

Figure 5:
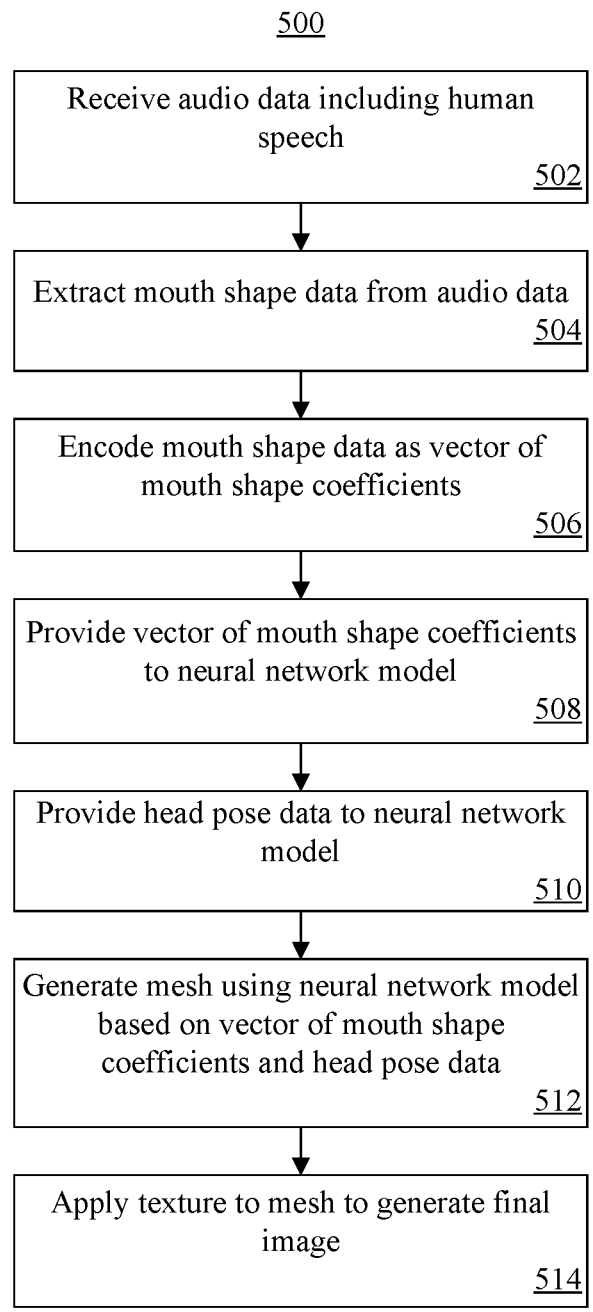
FIG. 5 illustrates an example method that may be performed by a system executing the architecture of FIG. 4.

FIG. 5 illustrates an example method 500 that may be performed by a system executing the architecture 100 of FIG. 4. As discussed, architecture 100 may be executed by a data processing system, e.g., a computer, as described in connection with FIG. 10 or another suitable computing system.

In block 502, the system receives audio data 110. The audio data includes speech. In block 504, the system extracts mouth shape data from audio data 110 using mouth shape extractor 102. In block 506, mouth shape extractor 102 encodes the extracted mouth shape data as a vector including a plurality of mouth shape coefficients 112. The mouth shape coefficients may be viseme coefficients. In block 508, the system provides the vector of mouth shape coefficients 112 to neural network model 104 as input. In block 510, the system optionally provides head pose data 114 to neural network model 104. In block 512, neural network model 104 generates a data structure output that specifies a visual representation. For example, neural network model 104 generates mesh 402 specifying a 3D representation of head and face that includes a mouth region. Mesh 402 specifies lips having a geometry corresponding to the vector of mouth shape coefficients 112. In block 514, the system applies texture to mesh 402 to generate a final image, e.g., image 406. Like mesh 402, image 406 includes lips having a shape corresponding to the vector of mouth shape coefficients 112.

It should be appreciated that method 500 may iterate to generate further meshes and/or final images. In general, for each vector of mouth shape coefficients 112 extracted from audio data 110, which corresponds to a particular moment in time, neural network model 104 is capable of generating a mesh 402 and/or image 406. Accordingly, for a sequence of vectors of mouth shape coefficients 112 extracted from audio data 110, where audio data 110 includes speech, the system is capable of generating a plurality of meshes 402 and/or images 406 that, taken collectively, form an animation of lip motion (e.g., a talking animation).

In one or more other example implementations, architecture 100 is adapted to receive an existing mesh and adapt the mesh to a particular mouth shape corresponding to a portion of audio.

Figure 6:
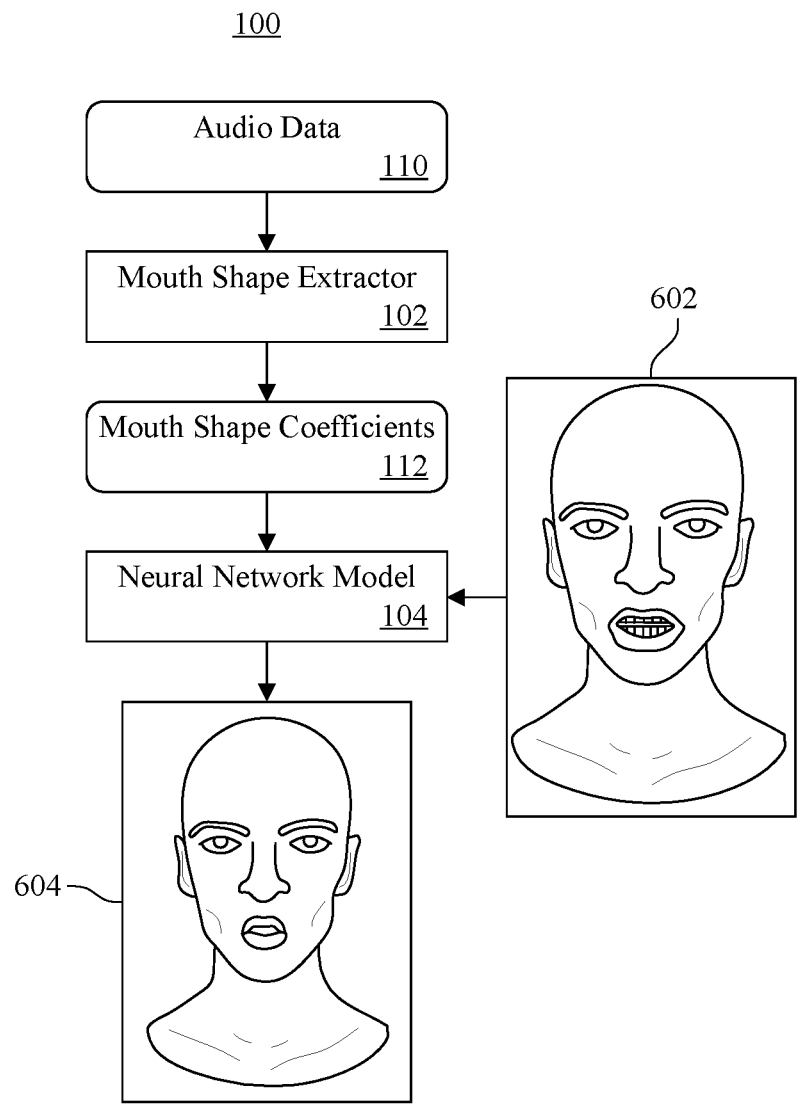
FIG. 6 illustrates another example of an architecture capable of adapting a mesh to a particular mouth shape.

FIG. 6 illustrates another example implementation of architecture 100 that capable of adapting a mesh to a particular mouth shape. In the example of FIG. 6, neural network model 104 is trained to modify a mesh based on a vector of mouth shape coefficients 112.

Certain portions of architecture 100 of FIG. 6 operate substantially similar to the example of FIGS. 1 and 4. For example, mouth shape extractor 102 extracts mouth shape data from audio data 110 and encodes the mouth shape data as a vector of mouth shape coefficients 112 that are provided to neural network model 104 as input. As noted, mouth shape coefficients 112 may be viseme coefficients. For purposes of illustration, audio data 110 may be for a voice saying the sound "uuuu" (e.g., a long u sound).

In the example of FIG. 6, neural network model 104 also receives a mesh 602 of a head and face with a mouth region having a particular shape including lips. The mouth shape of mesh 602 is one corresponding to a particular viseme. For example, mesh 602 may correspond to a mouth shape saying "eeee" (e.g., a long e sound). Thus, the shape of the mouth region in mesh 602 is different from the shape represented by mouth shape coefficients 112 as provided to neural network model 104.

Neural network model 104 is trained to modify mesh 602 based on mouth shape coefficients 112 to generate mesh 604. In one aspect, mesh 604 is a version of mesh 602, e.g., an adaptation of, derivation from, or new mesh from mesh 602 with a different mouth region. Mesh 604 specifies a head and face that includes a mouth region with lips shaped according to mouth shape coefficients 112. Mesh 604 includes lips having a shape (e.g., geometry) corresponding to vector of mouth shape coefficients 112. For example, mesh 604, as output from neural network model 104 in FIG. 6, is adapted to specify a mesh with a mouth region and lips corresponding to the sound "uuuu" as specified mouth shape coefficients 112.

Figure 7:
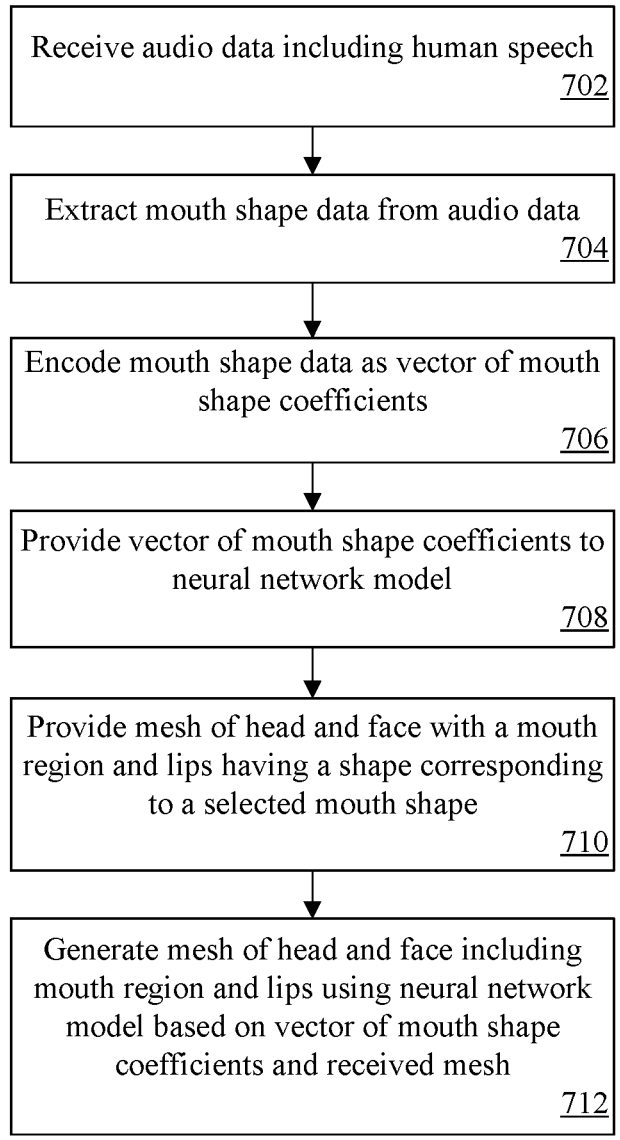
FIG. 7 illustrates an example method that may be performed by a system executing the architecture of FIG. 6.

FIG. 7 illustrates an example method 700 that may be performed by a system executing architecture 100 of FIG. 6. As discussed, architecture 100 may be executed by a data processing system, e.g., a computer, as described in connection with FIG. 10 or another suitable computing system.

In block 702, the system receives audio data 110. Audio data 110 includes human speech. In block 704, the system extracts mouth shape data from audio data 110 using mouth shape extractor 102. In block 706, mouth shape extractor 102 encodes the extracted mouth shape data as a vector including a plurality of mouth shape coefficients 112. In block 708, the system provides the vector of mouth shape coefficients 112 to neural network model 104 as input. In block 710, the system provides mesh 602 to neural network model 104. Mesh 602 specifies a head and face with a mouth region including lips having a shape corresponding to a particular, or selected, mouth shape (e.g., a viseme). In block 712, neural network model 104 generates a data structure output that specifies a visual representation. For example, neural network model 104 generates mesh 604 specifying a head and face including a mouth region and lip based on the vector of mouth shape coefficients 112 and mesh 602. Mesh 604 includes lips having a shape corresponding to the vector of mouth shape coefficients 112.

The examples of FIGS. 6 and 7 illustrate a technique in which, given a mesh for a first mouth shape or viseme, the mesh may be adapted to specify a second and different mouth shape or viseme. In one or more example implementations, mesh 602 may be the image (e.g., mesh 604) that is output from a prior iteration of architecture 100 of FIG. 6. That is, in operating architecture 100 of FIG. 6 for a plurality of sequential portions of audio to generate an animation of lip motion (e.g., a talking animation), mesh 602, also referred to as a "history frame," may be the output generated by a prior iteration of architecture 100 that is used to condition neural network model 104 for the next iteration.

In one or more other example implementations, the mouth region of the original mesh may be masked as provided to neural network model 104. By masking the mouth region of mesh 602, neural network model 104 utilizes only mouth shape coefficients 112 to generate the lip shape without relying on the mouth shape of a history frame. This approach also allows neural network model 104 to generate the rest of the facial motion (e.g., the mouth region including lips) conditioned on mouth shape coefficients 112 visemes and the mesh 602 absent the mount region.

Figure 8:
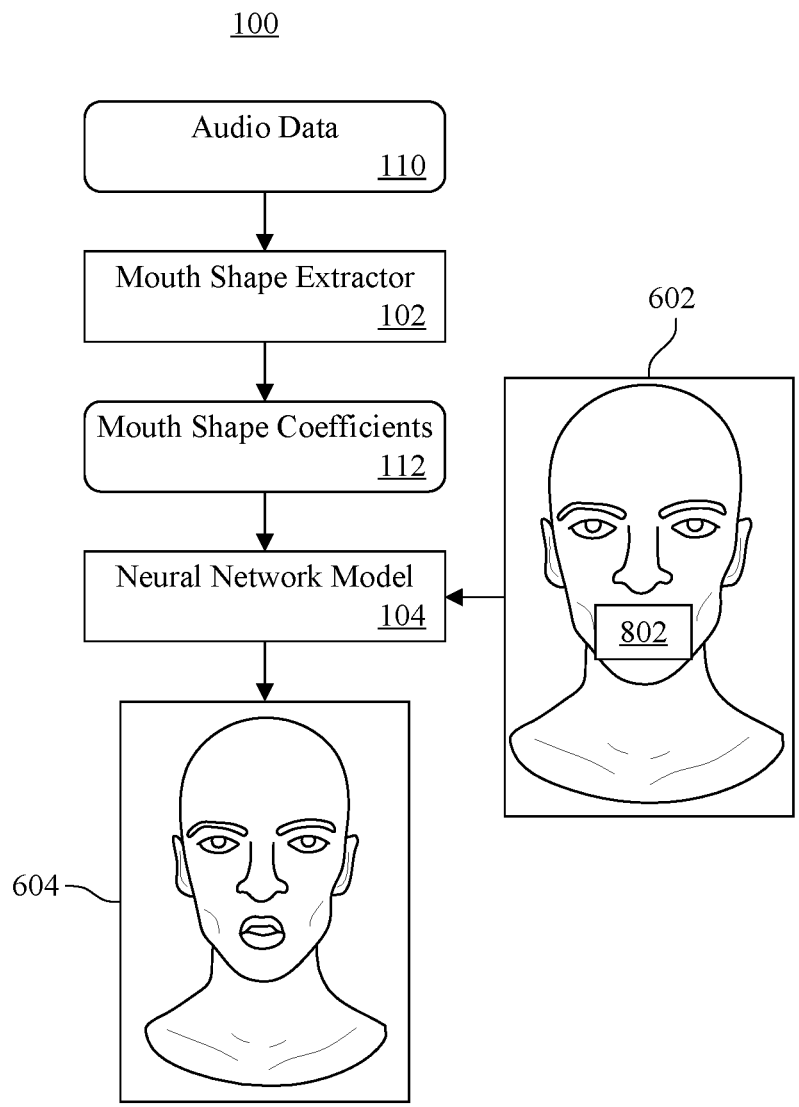
FIG. 8 illustrates another example of an architecture capable of adapting a mesh to a particular mouth shape.

FIG. 8 illustrates another example implementation of architecture 100 that may be used to adapt a mesh to a particular mouth shape. In the example of FIG. 8, neural network model 104 is trained to modify a mesh based on a vector of mouth shape coefficients 112. Further, the mouth region of mesh 602 is covered by a mask 802 (e.g., is masked).

Certain portions of architecture 100 of FIG. 8 operate substantially similar to the example of FIG. 6. For example, mouth shape extractor 102 extracts mouth shape data from audio data 110 and encodes the mouth shape data as a vector of mouth shape coefficients 112 that are provided to neural network model 104 as input. As noted, the mouth shape coefficients may be viseme coefficients. In the example of FIG. 8, neural network model 104 also receives mesh 602, with the mouth region masked by application of a mask 802. Thus, mesh 602 does not specify any mouth shape or lips or any particular viseme.

Neural network model 104 is trained to modify mesh 602 and fill in the mouth region based on vector of mouth shape coefficients 112 to generate mesh 604. In one aspect, mesh 604 is a version of mesh 602, e.g., an adaptation of, derivation from, or new mesh from mesh 602, having the mouth region filled in. In another aspect, Mesh 604 specifies a head and face that includes a mouth region having lips shaped according to mouth shape coefficients 112. Mesh 604 includes lips having a shape (e.g., geometry) corresponding to the vector of mouth shape coefficients 112. In this example, if the vector of mouth shape coefficients 112 is for the sound of "uuuu," mesh 604 will include lips shaped to produce the sound "uuuu."

Figure 9:
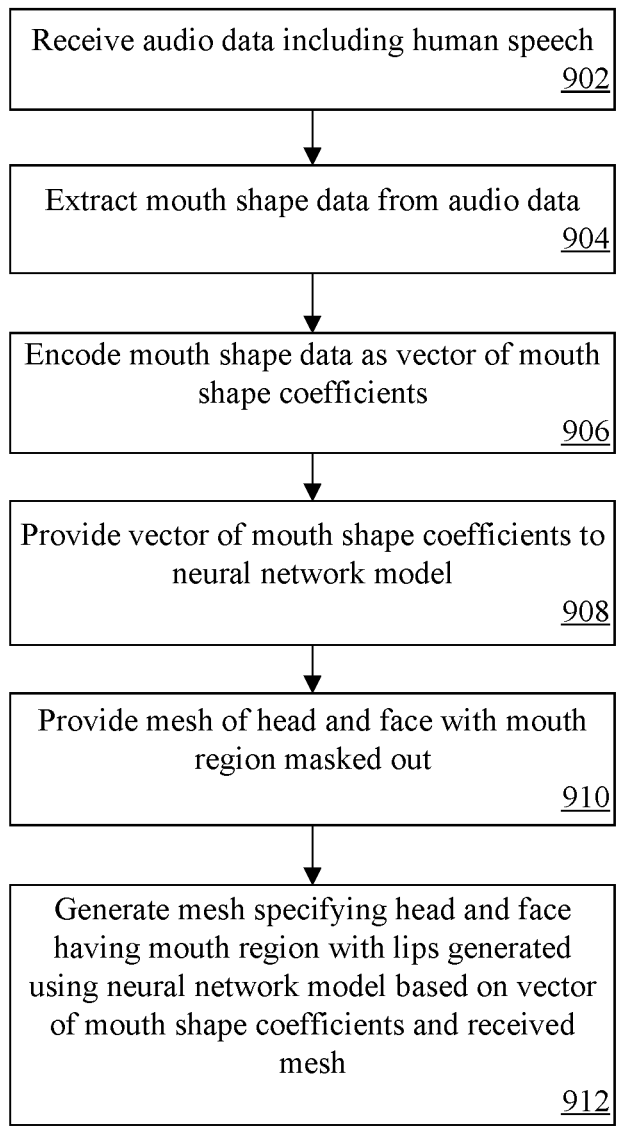
FIG. 9 illustrates an example method that may be performed by a system executing the architecture of FIG. 8.

FIG. 9 illustrates an example method 900 that may be performed by a system executing the architecture 100 of FIG. 8. As discussed, architecture 100 may be executed by a data processing system, e.g., a computer, as described in connection with FIG. 10 or another suitable computing system.

In block 902, the system receives audio data 110. Audio data 110 includes speech. In block 904, the system extracts mouth shape data from audio data 110 using mouth shape extractor 102. In block 906, mouth shape extractor 102 encodes the extracted mouth shape data as a vector including a plurality of mouth shape coefficients 112. In block 908, the system provides the vector of mouth shape coefficients 112 to neural network model 104 as input. In block 910, the system provides mesh 602 to neural network model 104. Mesh 602 specifies a head and face in which the mouth region masked so as not to specify any particular mouth shape, lip shape, or viseme. In block 912, neural network model 104 generates a data structure output that specifies a visual representation. For example, neural network model 104 generates mesh 604 specifying a head and face having a mouth region with lips based on the vector of mouth shape coefficients 112 by filling in the masked region of mesh 602. Mesh 604 includes lips having a shape corresponding to the vector of mouth shape coefficients 112.

Figure 10:
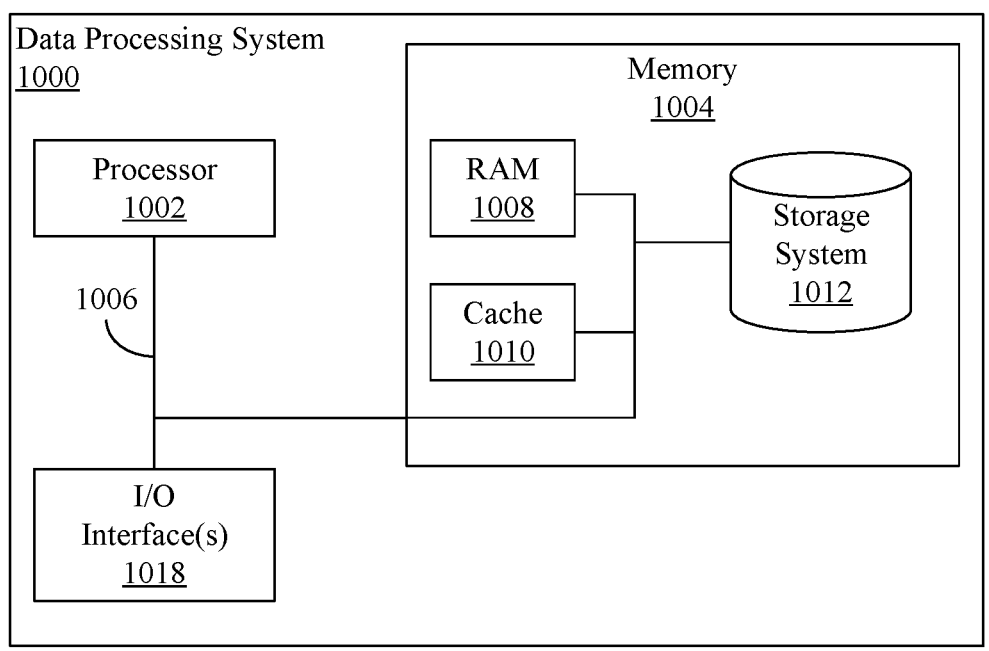
FIG. 10 illustrates an example implementation of a data processing system capable of executing the architectures described within this disclosure.

FIG. 10 illustrates an example implementation of a data processing system 1000. As defined herein, the term "data processing system" means one or more hardware systems configured to process data, each hardware system including at least one processor and memory, wherein the processor is programmed with computer-readable instructions that, upon execution, initiate operations. Data processing system 1000 can include a processor 1002, a memory 1004, and a bus 1006 that couples various system components including memory 1004 to processor 1002.

Processor 1002 may be implemented as one or more processors. In an example, processor 1002 is implemented as a central processing unit (CPU). Processor 1002 may be implemented as one or more circuits capable of carrying out instructions contained in program code. The circuit may be an integrated circuit or embedded in an integrated circuit. Processor 1002 may be implemented using a complex instruction set computer architecture (CISC), a reduced instruction set computer architecture (RISC), a vector processing architecture, or other known architectures. Example processors include, but are not limited to, processors having an 10×6 type of architecture (IA-32, IA-64, etc.), Power Architecture, ARM processors, and the like.

Bus 1006 represents one or more of any of a variety of communication bus structures. By way of example, and not limitation, bus 1006 may be implemented as a Peripheral Component Interconnect Express (PCIe) bus. Data processing system 1000 typically includes a variety of computer system readable media. Such media may include computer-readable volatile and non-volatile media and computer-readable removable and non-removable media.

Memory 1004 can include computer-readable media in the form of volatile memory, such as random-access memory (RAM) 1008 and/or cache memory 1010. Data processing system 1000 also can include other removable/non-removable, volatile/non-volatile computer storage media. By way of example, storage system 1012 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1006 by one or more data media interfaces. Memory 1004 is an example of at least one computer program product.

Memory 1004 is capable of storing computer-readable program instructions that are executable by processor 1002. For example, the computer-readable program instructions can include an operating system, one or more application programs, other program code, and program data. The computer-readable program instructions may implement any of the different examples of architecture 100 as described herein. Processor 1002, in executing the computer-readable program instructions, is capable of performing the various operations described herein that are attributable to a computer. It should be appreciated that data items used, generated, and/or operated upon by data processing system 1000 are functional data structures that impart functionality when employed by data processing system 1000. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor. Examples of data structures include images and meshes.

Data processing system 1000 may include one or more Input/Output (I/O) interfaces 1018 communicatively linked to bus 1006. I/O interface(s) 1018 allow data processing system 1000 to communicate with one or more external devices and/or communicate over one or more networks such as a local area network (LAN), a wide area network (WAN), and/or a public network (e.g., the Internet). Examples of I/O interfaces 1018 may include, but are not limited to, network cards, modems, network adapters, hardware controllers, etc. Examples of external devices also may include devices that allow a user to interact with data processing system 1000 (e.g., a display, a keyboard, a microphone for receiving or capturing audio data, speakers, and/or a pointing device).

Data processing system 1000 is only one example implementation. Data processing system 1000 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

The example of FIG. 10 is not intended to suggest any limitation as to the scope of use or functionality of example implementations described herein. Data processing system 1000 is an example of computer hardware that is capable of performing the various operations described within this disclosure. In this regard, data processing system 1000 may include fewer components than shown or additional components not illustrated in FIG. 10 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

The term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The different types of memory, as described herein, are examples of a computer readable storage media. A non-exhaustive list of more specific examples of a computer readable storage medium may include: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," "one or more embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," and similar language throughout this disclosure may, but do not necessarily, all refer to the same embodiment. The terms "embodiment" and "arrangement" are used interchangeably within this disclosure.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "responsive to" and similar language as described above, e.g., "if," "when," or "upon," mean responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present invention. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In this way, operatively coupling the processor to program code instructions transforms the machine of the processor into a special-purpose machine for carrying out the instructions of the program code. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowcharts or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the embodiments provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A computer-implemented method, comprising:
    providing, as an input feature to a neural network model, a vector of a plurality of coefficients, wherein each vector of the plurality of coefficients corresponds to a different mouth shape;
    providing, as a further input feature to the neural network model, head pose information; and
    generating, using the neural network model operating only on 3-dimensional data consisting of the vector of the plurality of coefficients and the head pose information, a data structure output specifying a visual representation of a mouth including lips having a shape corresponding to the vector.

2. The computer-implemented method of claim 1, wherein the plurality of coefficients of each vector are viseme coefficients.

3. The computer-implemented method of claim 2, further comprising:
    generating the viseme coefficients from audio data of speech.

4. The computer-implemented method of claim 2, further comprising:
    encoding the viseme coefficients into the vector provided to the neural network model.

5. The computer-implemented method of claim 1, wherein the data structure output is generated without using any facial landmark data.

6. The computer-implemented method of claim 1, wherein the data structure output is a Red-Green-Blue (RGB) 2-dimensional image.

7. The computer-implemented method of claim 1, wherein the data structure output is a mesh.

8. The computer-implemented method of claim 1, wherein the generating the data structure output includes:
    generating, using the neural network model, a plurality of images, wherein each image is generated from a different vector having a plurality of coefficients, and wherein the plurality of images collectively represent an animation of lip motion.

9. The computer-implemented method of claim 1, further comprising:
    providing to the neural network model, with the vector of the plurality of coefficients, a first mesh of a face;
    wherein the data structure output is a second mesh generated by the neural network model based on the vector and the first mesh of the face, wherein the second mesh is a version of the first mesh of the face that specifies the mouth including the lips having the shape corresponding to the vector.

10. A system, comprising:
    one or more processors configured to initiate operations including:
        providing, as an input feature to a neural network model, a vector of a plurality of coefficients, wherein each vector of the plurality of coefficients corresponds to a different mouth shape;
        providing, as a further input feature to the neural network model, head pose information; and
        generating, using the neural network model operating only on 3-dimensional data consisting of the vector of the plurality of coefficients and the head pose information, a data structure output specifying a visual representation of a mouth including lips having a shape corresponding to the vector.

11. The system of claim 10, wherein the plurality of coefficients of each vector are viseme coefficients.

12. The system of claim 11, wherein the one or more processors are configured to initiate operations including:
    generating the viseme coefficients from audio data of speech.

13. The system of claim 11, wherein the one or more processors are configured to initiate operations including:
    encoding the viseme coefficients into the vector provided to the neural network model.

14. The system of claim 10, wherein the data structure output is generated without using any facial landmark data.

15. The system of claim 10, wherein the data structure output is a Red-Green-Blue (RGB) 2-dimensional image.

16. The system of claim 10, wherein the data structure output is a mesh.

17. The system of claim 10, wherein the generating the data structure output includes:
    generating, using the neural network model, a plurality of images, wherein each image is generated from a different vector having a plurality of coefficients, and wherein the plurality of images collectively represent an animation of lip motion.

18. The system of claim 10, wherein the one or more processors are configured to initiate operations including:

providing to the neural network model, with the vector of the one or more coefficients, a first mesh of a face;

wherein the data structure output is a second mesh generated by the neural network model based on the vector and the first mesh of the face, wherein the second mesh is a version of the first mesh of the face that specifies the mouth including the lips having the shape corresponding to the vector.

19. A computer program product, comprising:

a computer readable storage medium, and program instructions collectively stored on the computer readable storage medium, wherein the program instructions are executable by one or more processors to initiate operations including:

providing, as an input feature to a neural network model, a vector of a plurality of coefficients, wherein each vector of the plurality of coefficients corresponds to a different mouth shape;

providing, as a further input feature to the neural network model, a first mesh of a head and face having a mouth region of the first mesh masked so as to specify no mouth or lip shape information;

wherein the vector of the plurality of coefficients and the first mesh information specify 3-dimensional data; and generating, using the neural network model operating only on the 3-dimensional data, a data structure output specifying a second mesh adapted from the first mesh, wherein the second mesh includes a mouth region including lips having a shape corresponding to the vector.

20. The computer program product of claim 19, wherein the plurality of coefficients of each vector are viseme coefficients.

* * * * *